United States Patent [19]

Binder et al.

[11] Patent Number: 5,614,011
[45] Date of Patent: Mar. 25, 1997

[54] THERMALLY SPLIT ZIRCONIUM SILICATE, METHOD OF ITS PRODUCTION AND USE

[75] Inventors: Dieter Binder, Alzenau; Peter Kleinschmit, Hanau; Klaus Zetzmann, Kleinostheim; Hans Hoffmeister, Gelnhausen, all of Germany

[73] Assignee: Degussa Aktiengesellschaft, Frankfurt am Main, Germany

[21] Appl. No.: 481,699

[22] Filed: Jun. 7, 1995

Related U.S. Application Data

[60] Continuation of Ser. No. 257,016, Jun. 8, 1994, abandoned, which is a division of Ser. No. 842,607, Feb. 27, 1992, Pat. No. 5,324,355.

[30] Foreign Application Priority Data

Mar. 1, 1991 [DE] Germany ............ 41 06 536.0

[51] Int. Cl.⁶ .................................. C01B 13/18
[52] U.S. Cl. .......................... 106/450; 264/235
[58] Field of Search ............... 106/450; 423/80, 423/69, 326; 264/235

[56] References Cited

U.S. PATENT DOCUMENTS

| | | | |
|---|---|---|---|
| 2,441,447 | 5/1948 | Seabright | 106/299 |
| 4,610,017 | 9/1986 | Perrier de la Bathie | 373/156 |
| 5,002,749 | 3/1991 | Recasens et al. | 423/608 |
| 5,011,673 | 4/1991 | Kriechbaum et al. | 423/608 |
| 5,021,092 | 6/1991 | Speer et al. | 106/451 |
| 5,043,016 | 8/1991 | Speer et al. | 106/450 |
| 5,205,866 | 4/1993 | Kiss et al. | 106/450 |
| 5,268,925 | 12/1993 | Binder et al. | 393/142 |
| 5,318,765 | 6/1994 | Binder et al. | 106/450 |
| 5,324,355 | 6/1994 | Binder et al. | 106/450 |

FOREIGN PATENT DOCUMENTS

| | | | |
|---|---|---|---|
| 154206 | 12/1951 | Australia | 433/69 |
| 0119877 | 9/1984 | European Pat. Off. . | |
| 0294664 | 5/1988 | European Pat. Off. . | |
| 2143525 | 8/1971 | Germany . | |
| 2312535 | 3/1973 | Germany . | |
| 2323770 | 5/1973 | Germany . | |
| 3906818 | 3/1989 | Germany . | |
| 1248595 | 10/1971 | United Kingdom . | |
| 1447276 | 8/1976 | United Kingdom . | |

OTHER PUBLICATIONS

"Zirconia Production Stepped Up," Ceramics, Feb. 1974, p. 30.
Gmelin's Handbook of Inorganic Chemistry, vol. 42 (1958), p. 56 (no month).
Prospectus Feb. 1983, No. 59 of The Goldscmidt Co. (Sep. 27, 1983).
W. C. Butterman et al. Amer. Mineralogist 52 (1967). p. 884 (no month).
Chem. Ing. Tech. 55 (1983) No. 90, pp. 716–717 "Uber das Skull–Schmelzen, Assmus et al "No month.

*Primary Examiner*—Michael Lewis
*Assistant Examiner*—Stuart L. Hendrickson
*Attorney, Agent, or Firm*—Beveridge, DeGrandi, Weilacher & Young, LLP

[57] ABSTRACT

Thermally split zirconium silicate is produced such that the crystalline zirconium dioxide embedded in an amorphous silica phase exhibits an average grain or particle size ($d_{50}$ value) in a range of 0.5 μm to 3.0 μm and a specific surface (BET) in a range of 3 to 15 m²/g. The zirconium dioxide produced by this method is particularly suited for the production of zirconium silicate pigments with improved color characteristics. The thermally split zirconium silicate is also particularly well suited for processes used in the obtention of zirconium dioxide. The method of producing the thermally split zirconium silicate includes melting zirconium silicate in an induction melting furnace and cooling off a free falling stream of melt by blowing on it with a gas and/or spraying it with water.

17 Claims, 3 Drawing Sheets

1μm

THERMALLY SPLIT ZIRCONIUM SILICATE, METHOD OF ITS PRODUCTION AND USE

This is a continuation of application Ser. No. 08/257,016 filed on Jun. 8, 1994, now abandoned, which is a divisional of Ser. No. 07/842,607 filed on Feb. 27, 1992, now U.S. Pat. No. 5,324,355.

BACKGROUND OF THE INVENTION

The invention is relative to thermally split zirconium silicate in which amorphous silica phase monoclinic zirconium dioxide crystals, with a defined grain distribution and specific surface, are embedded. Further subject matter of the invention is constituted by the production of this thermally split zirconium silicate and by its use.

Zirconium dioxide ($ZrO_2$) in the form of naturally occurring baddeleyite or of synthetically produced products is an important raw material in the production of zirconium dioxide ceramics and zirconium silicate pigments. Zirconium dioxide can be obtained by means of chemical decomposition with subsequent hydrolysis of the zirconates obtained at first or by means of the thermal splitting of zirconium silicate ($ZrSiO_4$) with subsequent separation of the silica. The thermal splitting of zirconium silicate takes place at temperatures above approximately 1700° C.—W. C. Butterman et al., Amer. Mineralogist 52 (1967). At approximately 1760° C., $ZrSiO_4$ begins to decompose into tetragonal, solid $ZrO_2$ and liquid $SiO_2$. Above approximately 2400° C., $ZrO_2$ and $SiO_2$ form a uniform liquid which solidifies by means of rapid cooling off—the thermally split zirconium silicate obtained in this manner is an amorphous silica phase in which zirconium dioxide crystals are embedded such that they can be separated by flotation methods and/or leaching methods from the $SiO_2$ phase.

Thermally split zirconium silicate, that is, $ZrO_2$ crystals in an amorphous $SiO_2$ matrix, like those which are known in the past and which have in part found entry into the market, can be obtained in various types of arc methods and plasma methods.

In the plasma methods, for example Great Britain Patent No. 1,248,595 and Ceramics, February 1974, p. 30, a curtain of zirconium sand is allowed to trickle through the flame of the plasma burner, during which the zirconium silicate is thermally split and then cooled off. A complete splitting of the $ZrSiO_4$ requires the use of extremely finely ground zircon powder; a grinding of the zirconium sand is energy-intensive and, in addition, foreign substances from the powder aggregate are entrained. The products obtainable in the plasma method contain $ZrO_2$ crystals with a diameter of 0.1 to 0.2 μm and a length of many μms (see Great Britain Patent No. 1,447,276). The crystals obtained by the plasma method exhibit a different morphology than that of the products in accordance with the present invention.

According to another method, zirconium silicate is melted in an arc and allowed to solidify as a block, the melted body subsequently is broken and ground ((see Gmelin's Handbuch der anorganischen Chemie (Gmelin's Handbook of Inorganic Chemistry), Zirconium, volume 42 (1958), p. 56)). The thermally split zirconium silicate produced in this manner contains zirconium dioxide with an average grain size ($d_{50}$ value) of approximately 15 to 20 μm and a BET surface of approximately 0.5 $m^2/g$.

Alternatively, the melt can also be removed from an arc melting furnace and converted into a spherical product by means of cooling off in air, as shown in German patent 26 35 030. The applicant of the present invention determined that the grain distribution of the zirconium dioxide in a thermally split zirconium silicate produced in this manner results in an average grain diameter—$d_{50}$ value, determined by laser diffraction—of over 3 μm and in a specific surface according to BET of approximately 2 $m^2/g$. The determination of substance data took place here, as in the other instances, on zirconium dioxide obtained by leaching out the thermally split zirconium silicate with concentrated sodium hydroxide solution to a residual $SiO_2$ content of below 0.5% by weight.

German Patent No. 2143525 and Great Britain Patent No. 1,447,276 teach that thermally split zirconium silicate is suitable as raw material for ceramic pigments based on zirconium silicate, e.g. inclusion pigments (e.g. zirconium-iron-rose) and pigments of the host lattice type (e.g. zirconium-vanadium-blue and zirconium-praseodymium yellow). It turned out that the increased requirements as regards color intensity and in part also the location of the color are no longer met by the previously accessible, thermally split zirconium silicate pigments. In order to increase the economy of the decorative design of ceramic articles and/or to obtain more brilliant color tones, the technical field is extremely interested in producing more color-intensive pigments. A starting point for the attainment of this goal is to find more suitable raw materials as the source for zirconium dioxide.

The present invention therefore is directed at solving the problem of providing novel, thermally split zirconium silicates which are more suitable as a source for zirconium dioxide in the production of the industries' more extracting zirconium silicate based pigments (i.e., thermally split zirconium silicates which permit more color-intensive pigments to be produced than the previously known thermally split zirconium silicates).

Thermally split zirconium silicate produced by the method of the present invention is characterized in that the zirconium dioxide embedded in an amorphous silica phase exhibits an average grain size ($d_{50}$ value) in a range of 0.5 μm to 3.0 μm and a specific surface (BET) in a range of 3 to 15 $m^2/g$. The zirconium dioxide exhibits, as is apparent from the scanning electron microscope photograph of FIG. 3, a typical morphology which could be designated as dendrite-shaped.

Preferred products of the present invention exhibit $d_{50}$ values in a range of 0.5 μm to 2.0 μm and a specific BET surface in a range of 5 $m^2/g$ to 12 $m^2/g$ for the zirconium dioxide embedded in the $SiO_2$ phase. Especially preferred products are distinguished by a very narrow grain spectrum of the zirconium dioxide and illustrated by the fact that at least 90% of the zirconium dioxide consists of particles with a diameter less than 10 μm, especially less than 5 μm and greater than 0.2 μm. The grain distribution, including the $d_{50}$ value, was determined by means of laser diffraction with water as the suspension liquid, sodium pyrophosphate as dispersing agent and 5 minutes ultrasound mixing in an HR 850 granulometer of the Cilas-Alcatel company. The BET surface was determined with nitrogen as adsorption gas in accordance with DIN 66131. The material characteristics were determined for zirconium dioxide obtained by leaching with concentrated sodium hydroxide solution.

The thermally split zirconium silicates of the invention differ, as explained above, in their material characteristics from those of previously known products. Previously known thermally split zirconium silicates, like those which have previously gained favor in the production of pigments, exhibit higher $d_{50}$ values and, in addition, a lesser BET surface. In contrast to the previously known products, zirconium silicate pigments of the host lattice type and inclusion type can be produced by the novel method of the present invention so as to have greater color intensity and a shifting of the particular color location in the desired direction along the color spectrum. Of the zirconium silicate pigments of the host lattice type, there is known pigments in particular in which the $Zr^{4+}$ positions in the lattice are occupied in a valently compensated manner by chromophoric ions such as vanadium-(blue), praseodymium-(yellow) or terbium ions (yellow) (see U.S. Pat. No. 2,441,447; Great Britain Patent No. 1,447,276; and prospectus 2/83, No. 59 of the Th. Goldschmidt Company). Of the pigments of the inclusion type, there is known pigments in particular in which the color-bearing component such as e.g. cadmium sulfoselenides, iron oxides, iron titanates, colloidal metals and iron-manganese compounds are inclosed in a casing of zirconium silicate (see German Patent No. 23 12 535; German Patent No. 23 23 770; German Patent No. 21 43 525; German-OS Patent No. 39 06 818; and European Patent No. 0,294,664). The advantageous effect, which could not have been foreseen, which the thermally split zirconium silicates of the present invention exert on the pigments follows from examples 2,3 and reference examples 2,3.

A further use of the products of the invention consists in the obtaining of the monoclinic zirconium dioxide contained in the thermally split zirconium silicate by means of known leaching methods. Among the known leaching methods, the one which uses concentrated alkali lyes, especially 30–50% by weight sodium hydroxide solution, are to be emphasized. The thermally split zirconium silicate is treated to this end once or repeatedly with the lye at in general 100° to 200° C., especially 115° to 170° C. under atmospheric or increased pressure and supplied to a solid-liquid phase separation. The leaching can be carried out isothermally or isobarically. At least 2 moles of alkali hydroxide, relative to one mole of the $SiO_2$ contained in the thermally split zirconium silicate, are used. The duration of the leaching, which is generally between 1 and 10 hours, is a function of the temperature, the lye concentration and the grain size of the thermally split zirconium silicate used. Zirconium dioxides with an $SiO_2$ content below 0.5% by weight are obtainable in this manner.

It was found that the thermally split zirconium silicate of the invention can be produced by means of inductively melting zirconium silicate in a high-frequency or medium-frequency induction furnace, for example, a coreless induction furnace, with a sintering crust crucible at a temperature in a range of 2500° to 3000° C. and by a subsequent quenching of the melt. The method is characterized in that the melt is drawn off in the form of a stream, this stream is fanned out in a free fall by blowing on it with an inert, cool gas and/or by spraying it with water and quenching the melt thereby and comminuting the product obtained in this manner as required in a breaking and/or grinding manner.

It is advantageous if a thin molten stream with a width of especially 5–20 mm is drawn off via a channel member extending off from the Crucible and if compressed air is blown on it with one or several nozzles. In general, the gas used should be at room temperature but higher or lower temperatures are also possible. Alternatively, the melt is sprayed, also while in free fall, with water from one or several nozzles. According to an especially preferred embodiment, air is first blown on the molten stream and then, while it is still in a free fall, water is sprayed on it, preferably from two or more optionally adjustable, superposed nozzles. In order to quench the drawn-off melt, an amount of air in the range of 0.1 to 3 $Nm^3$ air per kg melt is generally sufficient. For the quenching by spraying with water, an amount of water in a range of 10 to 100 l per kg melt has proven to be suitable. The product, which has now solidified, can be further cooled, to the extent necessary, in a water basin or a water groove. The product precipitates in the form of granules with a length of approximately 1 mm to 10 mm and can be dried and broken as required in a known manner and/or be ground dry or wet to the desired degree of grinding.

The manner of quenching is decisive for the material characteristics of the thermally split zirconium silicate and of the zirconium dioxide contained in it. A slow cooling off of the melt results in larger $ZrO_2$ crystals which entail the above-described disadvantages in the production of pigments. A simple pouring of the melt into water yields products with a very broad grain spectrum, which is disadvantageous for the formation of pigments and which is outside of the claimed range.

In order to melt the zirconium silicate for thermal splitting, those furnaces that are potential candidates are those in which a uniform melt can be produced and drawn off in the form of a thin stream. The melting can be effected e.g. by means of an arc or by inductive heating. An induction melting furnace with sintering crust crucible like that known from European Patent No. 0,119,877 is very well suited.

Zirconium silicate is cited by way of example in European Patent No. 0,119,877 as a material to be melted; however, there are no suggestions about the thermal splitting and the manner of how melt should be uniformly removed and quenched. According to an embodiment of European Patent No. 0,119,877, the furnace comprises an optionally cooled tube exiting laterally through the wire coil which tube is intended to serve for the removal of the melt; the melt is allowed to run out into a water basin. In the case of a melt of thermally split zirconium silicate, an increase in volume occurs during the cooling off, so that the flow-off tube becomes clogged: An opening of the run-off tube with chiseling and boring tools proved to be unsatisfactory on account of the hardness and brittleness of the solidified melt.

In order for the method to succeed, it is essential that a uniform stream of melt can be removed from the furnace and supplied to the quenching device. This succeeds if the method is carried in a semi-continuous manner in an induction melting furnace with internal wall provided by a melting inductor coil structure which encases a sintering crust crucible. A part of the melt, preferably 5 to 30% of the crucible contents, is removed at periodic intervals and an appropriate amount (e.g. an amount which when melted equals the amount discharged) of zirconium silicate is supplied to the crucible. An open run-out channel, which is located at the upper edge of the inductor coil structure and is intensively cooled, is used as the run-out device. The melt run-out is started at periodic intervals by broaching the melt with a broaching device and the run-out amount is regulated as required by regulated tipping of the furnace with a tipping device. The broaching device comprises a broaching lance and automatically controllable devices for varying the angle of inclination of the lance or for a vertical parallel shifting of the broaching lance, which is positioned horizontally or at an incline, and for extending and retracting the lance. The broaching lance is guided in such a manner that it first catches below the melt nose of the solidified melt from the preceding melt broaching remaining in the run-out channel and the lance is then raised so as to lift the nose and adjacent solidified material. The lance is subsequently driven forward between the raised, solidified melt and the bottom of the channel until the sintered crust formed in the inlet area of the channel is pierced.

DETAILED DESCRIPTION OF THE DRAWINGS

Figure 1:
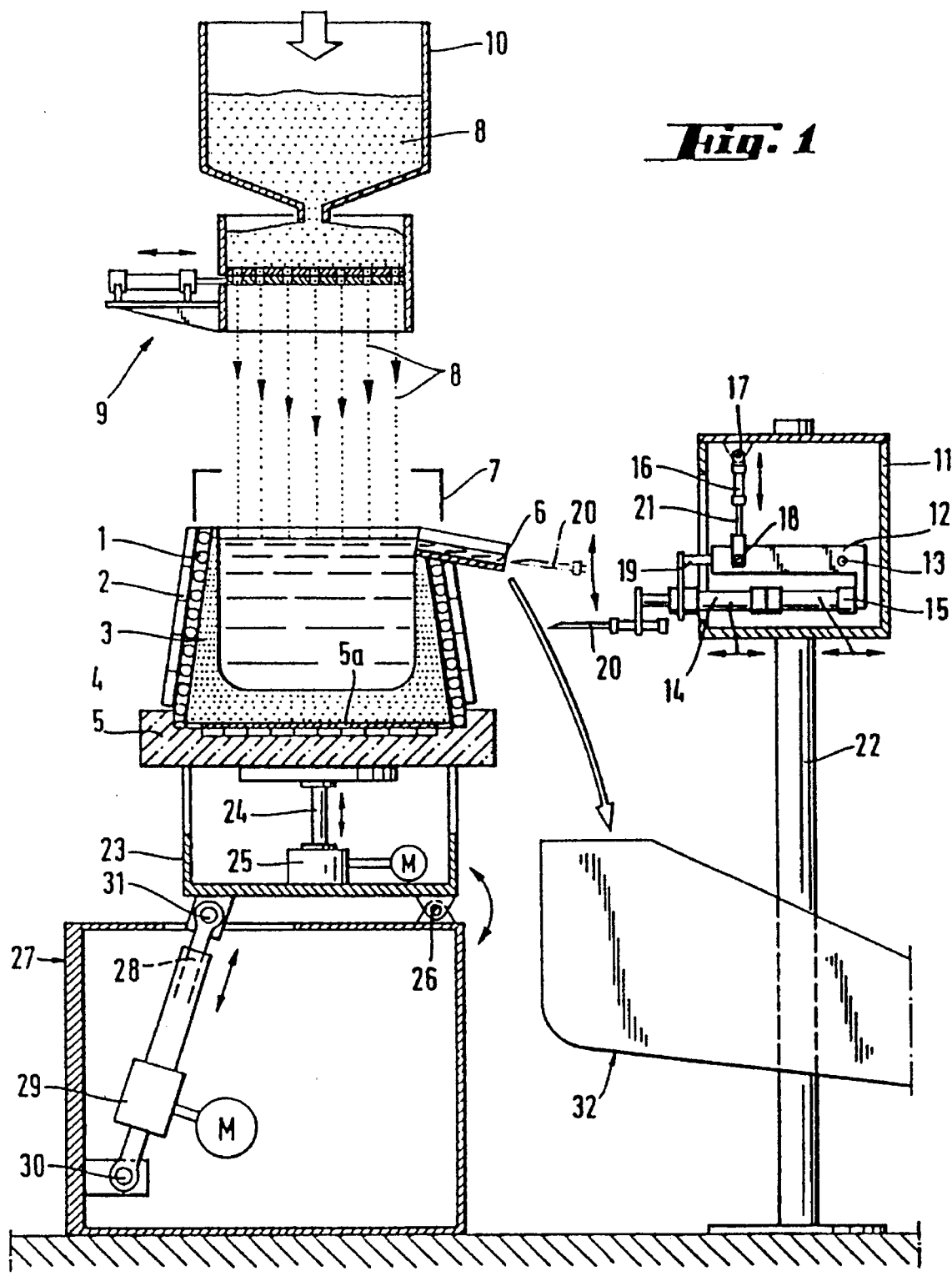
FIG. 1 shows an induction melting system suitable for the method of the invention with devices for filling the furnace, for broaching the melt and for cooling off the melt. The capacitors of the oscillating circuit, of the frequency generator and of other necessary electric devices are not shown. The resonance frequency of the oscillating circuit can be generated in the high-frequency range (greater than 10 kHz) by means of tube generators and in the medium-frequency range (around/less than 10 kHz) by means of thyristor-controlled generators of the invertor type.

In FIG. 1, reference numeral 1 denotes a melting inductor coil structure which is surrounded by cooling device 2 and which encases sintering crust crucible 3 which is formed from the material to be melted and receives melt 4. The melting inductor coil structure rests on cast form 5, which also receives cooled inductor coil bottom 5a, which is isolated from melting inductor coil structure 1. Open run-off channel 6 is fixed in the area of the upper edge of the inductor coil structure 1 (by means of holding device 6/4 shown in FIG. 2 and by bores 6/5 which receive fastening elements) in such a manner that the channel bottom is located before the broaching location of the melt and below the level of the melt and such that the upper edge of the channel is essentially commensurate with the edge of the inductor coil structure 1.

The inductor coil structure 1 can have one or several windings; single-winding coils of copper or aluminum are preferred because this makes it possible for coils with a larger coil diameter to be used, which is a prerequisite for using the furnace on a manufacturing scale. In order to facilitate the removal of the melt regulus after the end of the melting with periodic melt broachings and cooling-off, it is advantageous to employ an inductor coil structure which is in a slightly conical form (according to FIG. 1) because the melt material expands when cooling off due to modification transformations.

The melt crucible is charged from storage container 10, from which the material to be melted is supplied to a device 9 for the gravitational dosing of material 8 in a dispersed manner over the entire upper surface of the crucible. In order to minimize heat losses, thermal protection shields 7 can be arranged around the upper edge of the furnace; in addition, it is advantageous to keep the crucible surface covered with the material to be melted.

The solidified regulus can be readily removed from the crucible by means of a device 23 for raising and lowering the crucible bottom. Device 23 is shown in FIG. 1 to comprise a lift cylinder 24 and a drive unit 25. The amount of melt to be discharged is determined by means of a tilting device 27, which can be designed in various forms. Tilting device 27 is shown in FIG. 1 to include lift rod 28, drive unit 29, points of attachment 30 and 31 and furnace pivot point 26. The amount of outflow melt can be regulated by regulating the tilting of the furnace.

Device 32 serves for the further treatment of the melt periodically running out via channel 6. Reference number 34 designates a compressed-air nozzle, 33 a spray nozzle for water (3 superposed nozzles shown); the solidified material is supplied from device 32 designed as a vat to the drying devices and breaking and grinding devices (not shown).

The embodiment of the melt-broaching device shown in FIG. 1 comprises a lifting device designed as a pneumatic cylinder 16 fixed to fastening point 17 of holder 11. Lifting rod 21 is attached to shackle 12 at pivot point 18. Shackle 12 also receives advancing driving rod assembly 19 and is rotatably fastened to holder 11 at fastening point 13. The angle of inclination and the vertical position of broaching lance 20 can be varied by activating the lift cylinder and can be adapted therewith to the angle of inclination of run-out channel 6. A device for advancing and (retracting) the broaching lance or linkage assembly 19 supporting the lance is provided by two pneumatic cylinders 14,15 which are fastened to shackle 12 and receive the advancing linkage assembly supported by the shackle.

Figure 2:
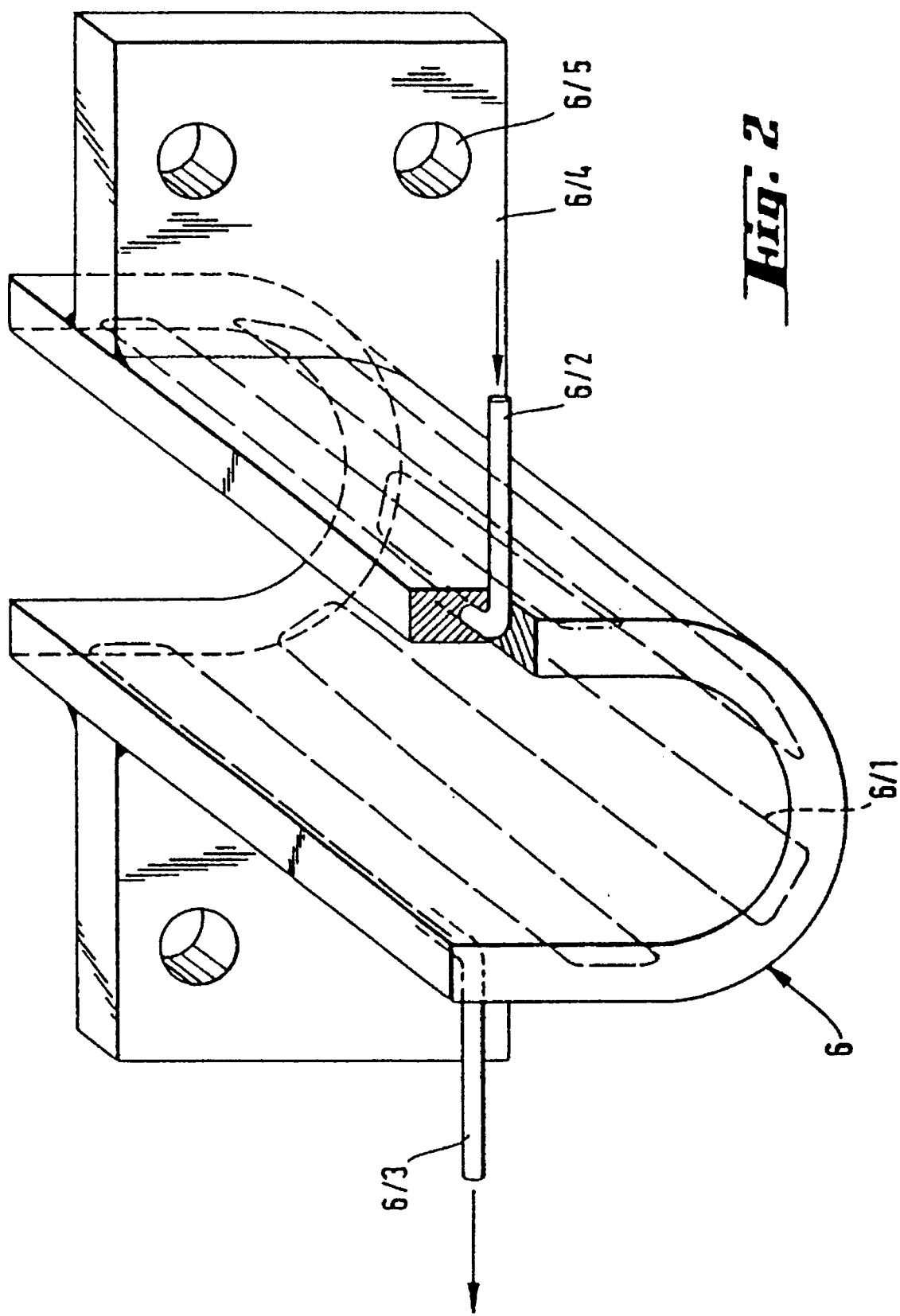
FIG. 2 shows an advantageous run-out groove for the melt.
Figure 3:
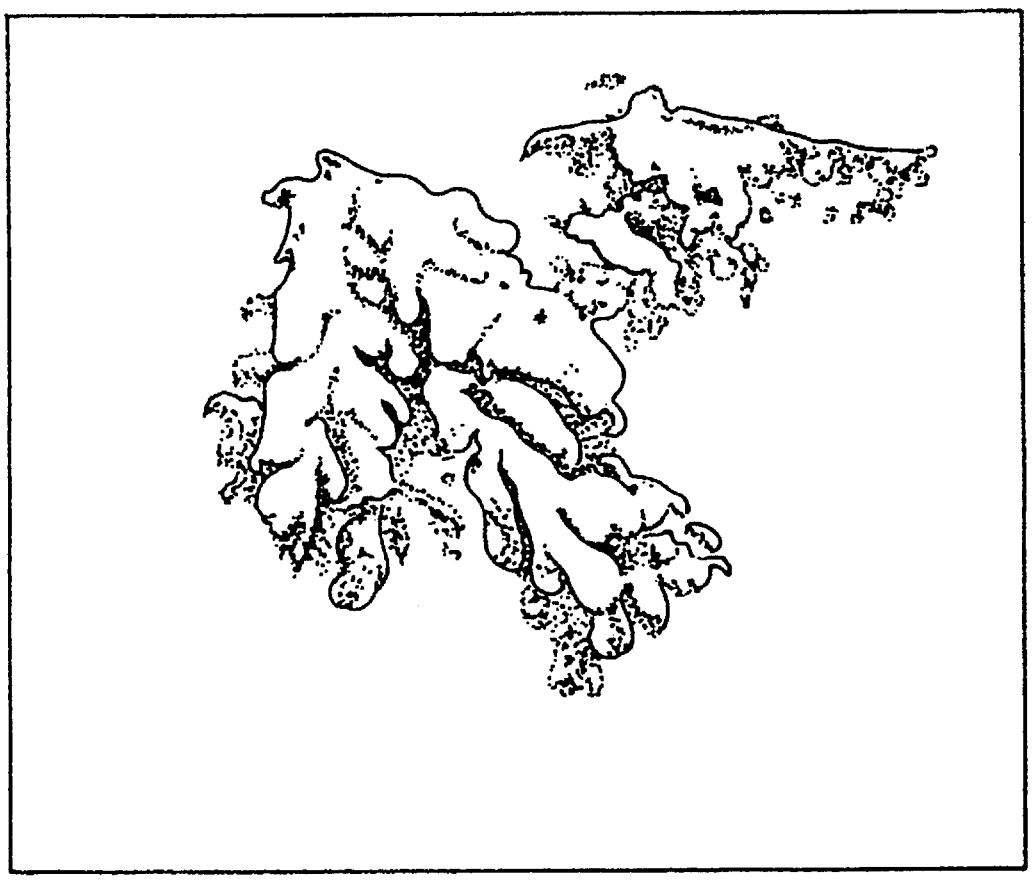
FIG. 3 shows a 1 μm scanning electron microscope photograph of a sample of the zirconium dioxide produced in accordance with the present invention.

FIG. 2 shows a preferred embodiment of the coolable channel which is open on top. The channel jacket contains a maximum number of bores 6/1 extending parallel to the longitudinal direction of the channel (shown in dotted lines in FIG. 2) which are connected to each other in a meandering fashion and through which a cooling medium flows which is supplied through line 6/2 and removed through line 6/3. Holder 6/4, which is fixed to the melting inductor coil structure support by means of fastening elements (6/5 represents a bore for this purpose), serves to position the channel. As intensive a cooling of the groove as possible is preferred because under this condition no cakings occur in the melting operation aside from a readily removable melt nose.

EXAMPLES

Examples 1a and 1b

In the system shown in FIG. 1, zirconium silicate was melted, a melt broaching periodically carried out and quenching performed by means of a compressed-air nozzle and two or three superposed water spray nozzles. The material was melted at 2700° C. using an inductor furnace with a single-winding melting inductor coil—diameter 40 cm, height 25 cm and an operating frequency 120 kHz. The width of the run-out channel (according to FIG. 2) was 16 mm with a cooling-water flowthrough of 400 liters/h. The throughput of zirconium silicate was 20 kg/h with 4 to 5 broachings per hour. Approximately 4 Nm$^3$ air and approximately 200 liters (example 1b) or 300 liters (example 1a) water were used per melt broaching for the quenching. The grain distribution and specific surface of the zirconium dioxide obtained by leaching out the thermally split zirconium silicate with 50% by weight sodium hydroxide solution until a residual content of below 0.5% by weight $SiO_2$ follow from the table.

|  | Example 1a | Example 1b |
| --- | --- | --- |
| Type of quenching | 1 air nozzle and 3 water nozzles | 1 air nozzle and 2 water nozzles |
| Grain distribution* | | |
| $d_{10}$ (μm) | 2.92 | 7.35 |
| $d_{50}$ (μm) | 0.94 | 1.96 |
| $d_{90}$ (μm) | 0.37 | 0.44 |
| Spec. surface (BET) m$^2$/g | 8.5 | 6.1 |

*The $d_{10}$ and $d_{90}$ values indicate that 10 or 90% of the material exhibits particle diameters above the indicated values; the $d_{50}$ value is the average particle diameter.

Example 2 and reference example 2

Production of a zirconium-iron pigment

A powder mixture was produced from the components cited in the following, annealed, worked up and tested in a glaze test. In example 2 the thermally split zirconium silicate according to example 1a was used and, in reference example 2, thermally split zirconium silicate ("S 120") of the SEPR company/France ($d_{50}$ value of the zirconium oxide contained therein=3.3 μm; BET surface=2.2 m$^2$/g).

| | | |
|---|---|---|
| ZrO$_2$/SiO$_2$: | 71 g (= thermally split zirconium silicate) | |
| ZrO$_2$: | 5 g (ZrO$_2$ "CC10" of the SEPR company) | |
| Fe$_2$O$_3$: | 16 g | |
| Na$_2$SiF$_6$: | 8 g | |
| Mixing: | 2 hours in centrifugal ball mill (grinding cup of hard porcelain 350 ml, grinding balls of Al$_2$O$_3$ φ 30 mm for 4 hours.) | |
| Annealing: | Heat in 100 ml fireclay crucible, lubricated with ZrSiO$_4$, covered with Al$_2$O$_3$ fragments, in 2 hours to 1050° C., 0.5 hours dwell time | |
| Workup: | Comminution of the reddish-brown annealing material after addition of 30 ml water in ball mill (see above), wash by means of a fivefold decanting with 1 liter water, dry at 110° C. in a drying cupboard. | |
| Glaze test: | Zirconium-clouded glaze, dyeing 6% pigments in glaze slip which is applied with a glaze carriage onto an earthenware body. | |
| Glaze baking: | Heat-up time 7 hours to 1100° C. Dwell time 45 min. at 1100° C. | |
| Color values: | CIE-Lab-color system (DIN 5033, 6164, 6174) | |

The following color values were found:

| | Example 2 | Reference example 2 |
|---|---|---|
| L | 50.5 | 56.3 |
| a | 20.9 | 19.5 |
| b | 14.7 | 17.5 |

In the CIE-Lab color system, axis L defines the brightness, wherein L=100 white and L=0 black. In the a axis, +a defines the red value and −a defines the green value. Also, in the b axis, +b defines the yellow value and −b defines the blue value. In the above Table, the L-value of the present invention's example 2 is lower than that of the comparative example; this corresponds to an increase in intensity. A redder shade in the present invention can be seen from the increase in the a value and the decrease in the b value.

The product of the invention thus results in a more intensive and redder pigment.

The pigments can be improved as regards the Lab values by optimizing the recipe of the mixture to be annealed, especially the FE feeder and the mineralizers; however, the difference between the thermally split zirconium silicate of the invention and the previously known thermally split zirconium silicate remains.

Example 3 and reference example 3

Production of a zirconium-vanadium blue pigment

In example 3, thermally split zirconium silicate of example 1b was used and in reference example 3 the market product "DIN 100" of the Huls AG company (d$_{50}$ value of the ZrO$_2$ contained therein=17.7 μm, BET surface=0.5 m$^2$/g).

| | |
|---|---|
| ZrO$_2$/SiO$_2$: | 85 g |
| NaF: | 5 g |
| NaCl: | 5 g |
| NH$_4$VO$_3$: | 5 g |
| Mixing: | 3 min. in a high-speed beater mill |
| Annealing: | In 100 ml fireclay crucible, lubricated with ZrSiO$_4$, covered with Al$_2$O$_3$ fragments. Heat-up time: 6 hours to 750° C. Dwell time: 1 hour |

Workup of the blue annealed material and the glaze test took place according to example 2/reference example 2:

| | Example 3 | Reference example 3 |
|---|---|---|
| L | 67.1 | 71.8 |
| a | −8.5 | −8.7 |
| b | −19.4 | −16.2 |

The product of the invention results in a more intensive and bluer pigment.

Further variations and modifications will be apparent to those skilled in the art and are intended to be encompassed by the claims appended hereto.

We claim:

1. A method of producing a pigment, comprising: selecting thermally split zirconium silicate having embedded therein, in an amorphous SiO$_2$ phase monoclinic, zirconium dioxide grains having a dendrite morphology, a specific surface area (BET) in the range of 3 to 15 m$^2$/g, and an average particle size (d$_{50}$ value) in the range of 0.5 μm to 3.0 μm, mixing said thermally split zirconium silicate with at least one other pigment ingredient; and annealing the resulting mixture for a period of time.

2. A method of producing a pigment as recited in claim 1 wherein said step of mixing includes adding Iron (III) Oxide.

3. A method as recited in claim 1 wherein the pigment is a host lattice pigment.

4. A method as recited in claim 3 wherein said pigment contains vanadium or praseodymium.

5. A method as recited in claim 1 wherein the pigment produced is an inclusion pigment.

6. A method as recited in claim 1 wherein zirconium dioxide grains of the zirconium silicate have a d$_{50}$ value of 0.5 μm to 2.0 μm and a specific surface area from 5 m$^2$/g to 12 m$^2$/g.

7. A method as recited in claim 6 wherein at least 90% of the zirconium dioxide grains of the zirconium silicate being mixed have a diameter of less than 10 μm and greater than 0.2 μm.

8. A method as recited in claim 1 wherein at least 90% of the zirconium dioxide grains of the zirconium silicate being mixed have a diameter of less than 10 μm and greater than 0.2 μm.

9. A method as recited in claim 1 further comprising breaking up in a grinding process said thermally split zirconium silicate which includes said zirconium dioxide grains embedded in said amorphous SiO$_2$ phase.

10. A method of producing a pigment, comprising:

mixing thermally split zirconium silicate having embedded therein, in an amorphous SiO$_2$ phase monoclinic, zirconium dioxide with an average particle size (d$_{50}$ value) in a range of 0.5 μm to 3.0 μm, a specific surface area (BET) in a range of 3 to 15 m$^2$/g and a dendrite morphology with at least one other pigment ingredient.

11. A method of producing a pigment as recited in claim 10 further comprising breaking up said thermally split zirconium silicate by a grinding process.

12. A method as recited in claim 10 wherein zirconium dioxide grains of the zirconium silicate being mixed have a d$_{50}$ value of 0.5 μm to 2.0 μm and a specific surface area from 5 m$^2$/g to 12 m$^2$/g.

13. A method as recited in claim 10 wherein at least 90% of the zirconium dioxide grains of the zirconium silicate being mixed have a diameter of less than 10 μm and greater than 0.2 μm.

14. A method as recited in claim 10 wherein the pigment produced is a host lattice pigment.

15. A method as recited in claim 10 wherein the pigment produced is an inclusion pigment.

16. The method of using a thermally split zirconium silicate having embedded therein monoclinic zirconium dioxide grains which grains have a dendrite morphology, an average particle size ($d_{50}$ value) in a range of 0.5 μm to 3.0 μm and a specific surface area (BET) in a range of 3 to 15 m$^2$/g to make a more color intensified pigment comprising mixing said thermally split zirconium silicate with at least one other pigment ingredient and then annealing the resulting mixture for a period of time.

17. The method of using a thermally split zirconium silicate to produce a pigment having more intense color comprising mixing a thermally split zirconium silicate comprised of zirconium dioxide grains having a dendrite morphology and an average particle size ($d_{50}$ value) in a range of 0.5 μm to 3.0 μm with at least one other pigment ingredient;

annealing the resulting mixture for a period of time, said zirconium dioxide grains having a specific surface area (BET) in the range of 3 to 15 m$^2$/g, said thermally split zirconium silicate having been produced by a method comprising melting zirconium silicate in the furnace with sintering crust crucible at a temperature in the range of 2500° to 3000° C.;

drawing melted zirconium silicate off from the furnace;

said melt being drawn off in the form of a stream with said stream being placed in a free fall; and subjecting said stream to a cooling fluid and quenching the melt thereby and comminuting the quenched melt such that there is produced zirconium dioxide embedded in an amorphous silica phase that exhibits an average grain size ($d_{50}$ value) in the range of 0.5 μm to 3.0 μm and a specific surface (BET) in the range of 3 to 15 m$^2$/g.

* * * * *